United States Patent
Keigley (10) Patent No.: US 10,149,440 B2
(45) Date of Patent: Dec. 11, 2018

(54) EDGING TOOLS FOR WORK MACHINES

(71) Applicant: Absolute Innovations, Inc., Mishawaka, IN (US)

(72) Inventor: Kevin V. Keigley, Osceola, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 315 days.

(21) Appl. No.: 15/002,477

(22) Filed: Jan. 21, 2016

(65) Prior Publication Data

US 2016/0212938 A1 Jul. 28, 2016

Related U.S. Application Data

(60) Provisional application No. 62/106,259, filed on Jan. 22, 2015.

(51) Int. Cl.
 *A01B 63/32* (2006.01)
 *A01G 3/06* (2006.01)
 *A01B 69/02* (2006.01)

(52) U.S. Cl.
 CPC .............. *A01G 3/062* (2013.01); *A01B 63/32* (2013.01); *A01B 69/024* (2013.01)

(58) Field of Classification Search
 CPC ... A01B 61/044; A01B 61/046; A01B 63/104; A01B 63/008; A01B 63/32; A01B 69/024; A01B 35/16
 See application file for complete search history.

(56) References Cited

U.S. PATENT DOCUMENTS

| | | | |
|---|---|---|---|
| 753,452 A | 3/1904 | Van Brunt |
| 833,213 A | 10/1906 | Howard |
| 1,106,541 A | 8/1914 | Bruce |
| 2,277,880 A | 3/1942 | Noble |
| 2,292,488 A | 8/1942 | Stevens, Jr. |
| 2,358,298 A | 9/1944 | Benjamin |
| 2,464,695 A | 3/1949 | Landrum |
| 2,555,441 A | 6/1951 | Hackney |
| 2,664,507 A | 12/1953 | Mural |
| 2,676,447 A | 4/1954 | Asbury |
| 2,683,404 A | 7/1954 | Buhr |
| 2,685,384 A | 8/1954 | Tanke |
| 2,687,074 A | 8/1954 | Tanke et al. |
| 2,692,543 A | 10/1954 | Tanke et al. |
| 2,705,445 A | 4/1955 | Giordano |
| 2,737,105 A | 3/1956 | Wilson |
| 2,815,704 A | 12/1957 | Bloom et al. |
| 2,883,977 A | 4/1959 | Langmaier |
| 2,942,360 A | 6/1960 | Hawkins et al. |
| 2,969,601 A | 1/1961 | McMaster |
| 3,048,981 A | 8/1962 | Mark et al. |
| 3,057,411 A | 10/1962 | Carlton |
| 3,305,028 A | 2/1967 | Schaper |

(Continued)

*Primary Examiner* — Matthew D. Troutman
(74) *Attorney, Agent, or Firm* — Taft Stettinius & Hollister, LLP (57) ABSTRACT

One embodiment is a work machine including a frame extending along a length, a width and a height. Front and rear ground contacting wheels are rotatably coupled with the frame. A linkage is coupled with the frame and a tool mount coupled with the linkage. A suspension element accommodates movement of the tool mount in response to external force. An actuator system is structured to move the tool mount through translation and/or rotation. An edging tool assembly is coupled with the tool mount and includes a ground working implement.

6 Claims, 6 Drawing Sheets

(56) References Cited

U.S. PATENT DOCUMENTS

| | | |
|---|---|---|
| 3,537,244 A | 11/1970 | Hicks |
| 3,683,522 A | 8/1972 | Rousseau et al. |
| 3,711,158 A | 1/1973 | Butcher |
| 3,907,039 A | 9/1975 | Remley |
| 4,002,205 A | 1/1977 | Falk |
| 4,046,200 A | 9/1977 | Mullet et al. |
| 4,077,478 A | 3/1978 | Neukom |
| 4,116,140 A | 9/1978 | Anderson et al. |
| 4,131,162 A | 12/1978 | Schmitz |
| 4,275,670 A | 6/1981 | Dreyer |
| 4,300,155 A | 11/1981 | Sagishima |
| 4,311,104 A | 1/1982 | Steilen et al. |
| 4,359,101 A | 11/1982 | Gagnon |
| 4,396,069 A | 8/1983 | Ferber et al. |
| 4,629,006 A | 12/1986 | Mullet et al. |
| 4,691,784 A | 9/1987 | Mullet et al. |
| 4,700,785 A | 10/1987 | Bartusek et al. |
| 4,715,169 A | 12/1987 | Ould |
| 4,724,910 A | 2/1988 | Wheeler |
| 4,871,026 A | 10/1989 | Bernard |
| 4,930,580 A | 6/1990 | Fuss et al. |
| 4,949,536 A | 8/1990 | Neufeld |
| 4,979,573 A | 12/1990 | Williamson |
| 5,065,681 A | 11/1991 | Hadley |
| 5,135,287 A | 8/1992 | Karnes |
| 5,156,218 A | 10/1992 | Metzler et al. |
| 5,159,803 A | 11/1992 | Earley |
| 5,366,024 A | 11/1994 | Payne |
| 5,407,012 A | 4/1995 | Klopfer |
| 5,417,293 A | 5/1995 | Leader |
| 5,685,245 A | 11/1997 | Bassett |
| 5,701,693 A | 12/1997 | Brocious et al. |
| 5,727,638 A | 3/1998 | Woodrich et al. |
| 5,806,606 A | 9/1998 | Robinson |
| 5,915,835 A | 6/1999 | Fair |
| 6,044,916 A | 4/2000 | Hundeby |
| 6,125,943 A | 10/2000 | Valois |
| 6,293,349 B1 | 9/2001 | Marshall et al. |
| 6,318,006 B1 | 11/2001 | Hall |
| 6,343,461 B1 | 2/2002 | Knott |
| 6,349,488 B1 | 2/2002 | Mason |
| 6,431,287 B1 | 8/2002 | Ramp |
| 6,464,015 B1 | 10/2002 | Jones |
| 6,533,307 B1 | 3/2003 | Singh |
| 6,606,956 B1 | 8/2003 | Paluch |
| 6,701,857 B1 | 3/2004 | Jensen et al. |
| 6,789,336 B2 | 9/2004 | Collins et al. |
| 6,883,616 B2 | 4/2005 | Templeton |
| 6,938,699 B2 | 9/2005 | Templeton et al. |
| 7,040,448 B2 | 5/2006 | Good |
| 7,093,380 B2 | 8/2006 | Hubscher et al. |
| 7,219,452 B1 | 5/2007 | Raguse |
| 7,392,853 B2 | 7/2008 | Baran |
| 7,650,708 B2 | 1/2010 | Gordon et al. |
| 7,743,844 B2 | 6/2010 | Kovach et al. |
| 7,938,193 B2 | 5/2011 | Baker |
| 8,047,299 B2 | 11/2011 | Hurtis et al. |
| 8,266,566 B2 | 9/2012 | Hopkins et al. |
| 8,286,566 B2 | 10/2012 | Schilling et al. |
| 8,555,798 B2 | 10/2013 | Schilling et al. |
| 8,915,347 B2 | 12/2014 | Hoppel |
| 9,055,714 B2 | 6/2015 | Hoppel |
| 2002/0148211 A1 | 10/2002 | Templeton |
| 2003/0164125 A1 | 9/2003 | Paluch et al. |
| 2006/0011357 A1 | 1/2006 | Casey |
| 2007/0163221 A1 | 7/2007 | Foster |
| 2007/0221390 A1 | 9/2007 | Hager |
| 2008/0142233 A1 | 6/2008 | Hurtis et al. |
| 2010/0083626 A1 | 4/2010 | Foster |
| 2011/0083867 A1 | 4/2011 | Leith |
| 2011/0120357 A1 | 5/2011 | Schilling et al. |
| 2011/0313572 A1 | 12/2011 | Kowalchuk et al. |
| 2013/0264080 A1 | 10/2013 | Keigley |
| 2015/0060094 A1 | 3/2015 | Underhill |
| 2015/0068178 A1 | 3/2015 | Hoppel |

EDGING TOOLS FOR WORK MACHINES

BACKGROUND

The present application relates generally to edging tools for work machines and methods of operating such tools. Existing tools for edging ground cover foliage such as grass or turf suffer from a number of shortcomings. They fail to provide adequate control or precision over edging geometry for curved as well as straight edges. They further fail to allow precise and accurate depth control and adjustment for the cutting implements of working tools. Existing tools also fail to provide effective and adaptable sighting guide features. They further fail to adapt to obstructions or unevenness in the underlying ground surface. These failures are present in a variety of applications and are particularly acute in applications with high demands for uniformity and precision of both straight and curved edges such as baseball grounds keeping. There remains a significant need for the unique apparatuses, systems and methods disclosed herein.

DISCLOSURE OF ILLUSTRATIVE EMBODIMENTS

For the purposes of clearly, concisely and exactly describing exemplary embodiments, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique edging tool for a work machine. Another embodiment comprises a work machine including a frame extending along a length, a width and a height. Front and rear ground contacting wheels are rotatably coupled with the frame. A linkage is coupled with the frame and a tool mount coupled with the linkage. A suspension element accommodates movement of the tool mount in response to external force. An actuator system is structured to move the tool mount through translation and/or rotation. An edging tool assembly is coupled with the tool mount and includes a ground working implement. Further embodiments, forms, objects, features, advantages, aspects, and benefits shall become apparent from the following description and drawings.

DETAILED DESCRIPTION OF ILLUSTRATIVE EMBODIMENTS

Figure 1:
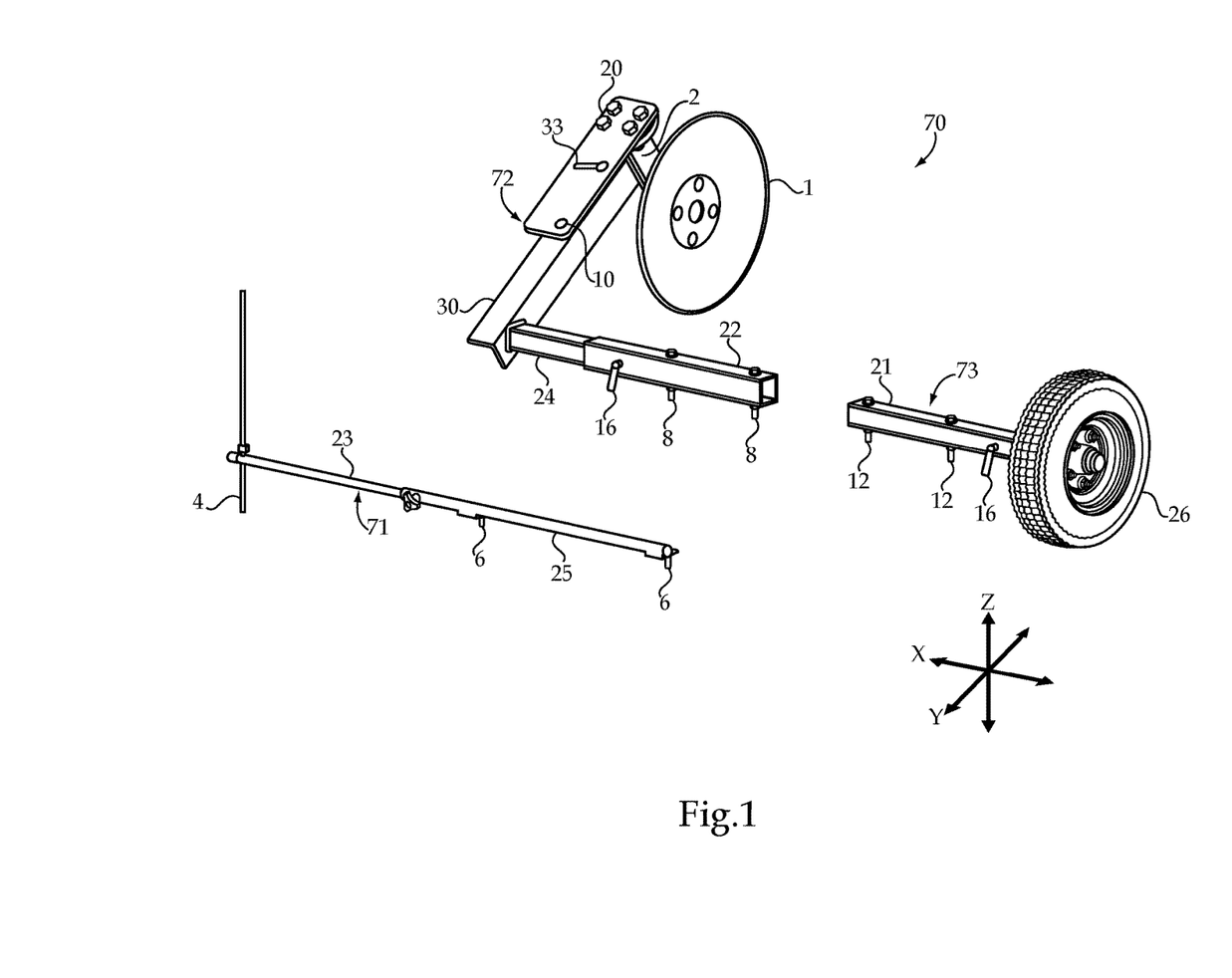
FIGS. 1 and 2 are perspective views of an exemplary edging tool.
Figure 2:
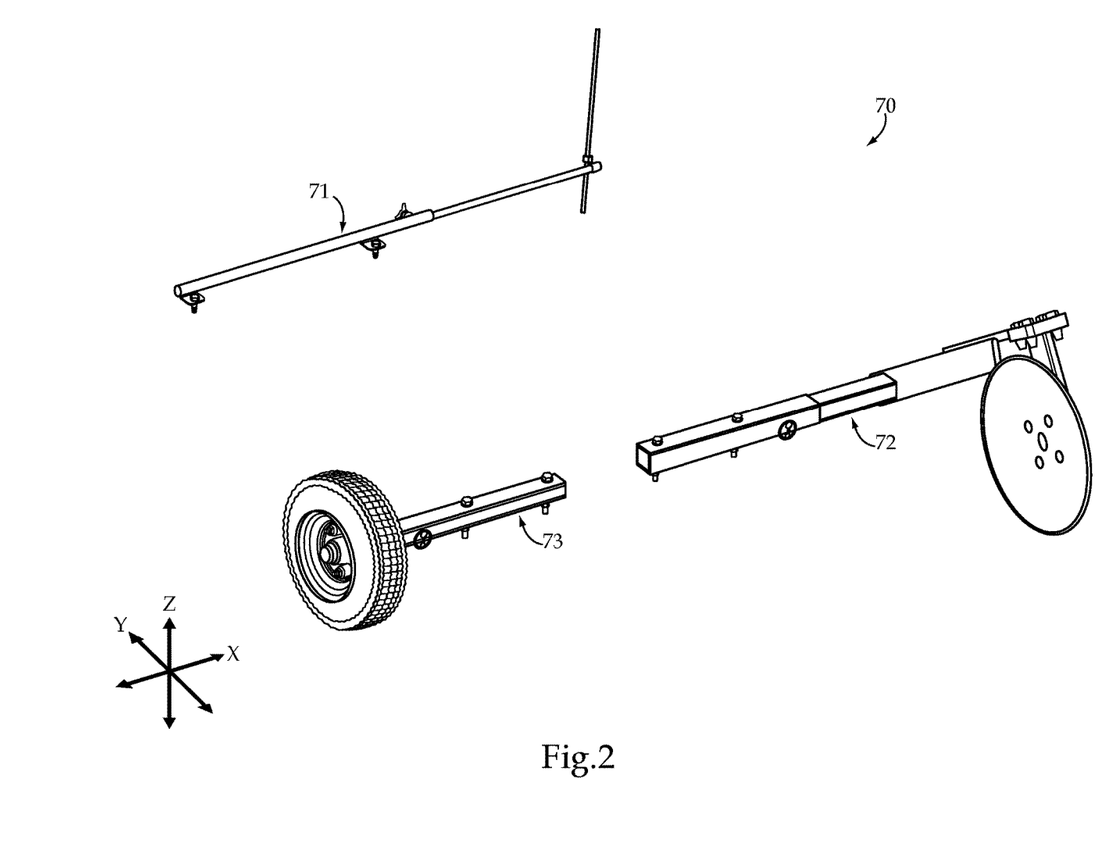

With reference to FIGS. 1 and 2 there is illustrated an exemplary edging tool 70 which is structured to couple with a self-propelled work machine. In one exemplary embodiment, the work machine is a zero turning radius, self-propelled work machine. The term zero turning radius refers to work machines that are capable of turning by rotating or spinning about an axis without having to follow an arcuate turning path (though they may be controlled to follow such paths). Zero turning radius work machines may be said to have a turning radius defined by the outer diameter of the wheels or other ground contacting members which propel rotation about the axis or, alternatively a turning radius measured from the axis of rotation to the outermost extent of the work machine structure.

One example of a zero turning radius self-propelled work machine with which the edging tools disclosed herein may be coupled is disclosed in co-pending U.S. application Ser. No. 13/860,367, the disclosure of which is hereby incorporated by reference. In further exemplary embodiments the work machine may be structured in a number of different forms. Additional non-limiting examples of the type of work machines which may be adapted to be coupled with the edging tools disclosed herein include ATV-type work machines, skid steer-type work machines, and tractor-type work machine, among others. It shall be appreciated that certain modifications in the coupling structure, tool mount structure, actuator structure and operator controls of such machines may be made to accommodate coupling with edging tool 70 or portions thereof, and that edging tool 70 may likewise be modified to couple with such machines.

In the illustrated embodiment, edging tool 70 includes three assemblies: sighting guide assembly 71, edging disc assembly 72, and support wheel assembly 73. Assemblies 71, 72 and 73 are structured to couple with respective engagement features provided on a work machine. In certain embodiments edging disc assembly 72 and support wheel assembly 73 are structured to couple with a tool mount coupled with the work machine and sighting guide assembly 71 is structured to couple with the work machine at a location forward from the tool mount. In certain embodiments the tool mount is structured to provide one or more of rotational movement about an axis parallel with the X axis direction, translational movement in the Y axis direction, and translational movement in the Z axis direction. It shall be further appreciated that certain embodiments may omit either or both of sighting guide assembly 71 and support wheel assembly 73.

Sighting guide assembly 71 includes an attachment member 25 and fasteners 6 which are structured to couple attachment member 25 with a work machine. One exemplary coupling is illustrated and described in connection with FIGS. 3 and 4, but a variety of different coupling and fastener structures are contemplated. Assembly 71 further includes an extension member 23 which extends laterally outward from attachment member 25. A sighting marker 4 is positioned perpendicular to and coupled with extension member 23. Sighting marker 4 maybe positioned at a plurality of different locations relative to extension member 23 to vary the distance of sighting marker 4 from attachment member 25, including the various particular predetermined locations described in further detail below in connection with FIG. 6.

In the illustrated embodiment, sighting marker 4 is coupled with extension member 23 by insertion into any of a plurality of insertion holes defined in extension member 23. Extension member 23 is itself moveable in the X axis direction relative to attachment member 25 and can be held in a desired position by loosening or tightening the illustrated set screw. In the illustrated embodiment extension member 23 is telescopically moveable relative to attachment member 25, but a variety of other structural configurations providing such movement are contemplated. In the illustrated embodiment extension member 23 and attachment member 25 are positioned substantially even with the front wheels 104 of the work machine 100 such that a X-Z plane can be defined that intersects both the sighting marker 4 and the front wheels 104. Other embodiments may be structured to position the sighting marker 4 in planes forward or rearward from the illustrated position. Some embodiment may include multiple sighting markers located in multiple predetermined positions.

One or more predetermined position indicators may be provided on or in connection with extension member 23 and/or attachment member 25. Extension member 23 can be retracted when not in use without requiring de-coupling of attachment member 25 from the work machine, and when re-extended can be accurately and reliably positioned to place sighting marker 4 in a desired position. Additionally extension member 23 is itself moveable in the X axis direction provides an additional degree of freedom in positioning sighting marker 4 thereby accommodating a variety of different sighting needs corresponding to a variety of different desired edging geometries.

Edging disc assembly 72 includes attachment member 22 and fasteners 8 which are structured to couple attachment member 22 with a tool mount of a work machine. One exemplary coupling is illustrated and described in connection with FIGS. 3 and 4, but a variety of different coupling and fastener structures are contemplated. Edging disc assembly 72 further includes member 24 which extends laterally outward from attachment member 22 over a distance in the X axis direction. In the illustrated embodiment member 24 is telescopically moveable relative to attachment member 22, but a variety of other structural configurations providing such movement are contemplated. In the illustrated embodiment set pin 16 is provided to maintain the relative positioning of member 24 relative to attachment member 22 and allow member 24 to be removed from or repositioned relative to attachment member 22 without requiring attachment member 22 to be removed from the tool mount of the work machine with which it is coupled. A variety of alternate coupling and fastening structures are also contemplated.

Member 30 extends rearward from and at an angle relative to member 24. Mounting member 20 is coupled with member 30 at pivot point 10 and is rotatable thereabout relative to member 30. Rotation of mounting member 20 about pivot point 10 allows edging disc 1 to be positioned at various angles including parallel to the Y-Z plane axis and at other positions rotated relative to the Y-Z plane. In certain rotated positions edging disc 1 will collect or push portions of turf being cut by edging disc 1. In certain rotated positions edging disc 1 will plow underlying portions of the underlying ground surface. In the illustrated embodiment the edging disc can be rotated over a rage determined by arcuate slot 33. In one preferred form the rotation permitted by slot 33 provides up to a two inch wide plowing furrow area. Disc mount member 2 extends in a downward direction from rotatable mounting member 20. Edging disc 1 is rotatably coupled with disc mount member 2. In the illustrated embodiment edging disc 1 includes a conically shaped portion although other structural configurations are contemplated including flat discs and discs with both flat and conical portions. In the illustrated embodiment edging disc 1 is positioned to be substantially even with the rear wheels of the work machine.

In certain embodiments the axis of rotation of the edging disc 1 is substantially in line with the axis of rotation of the rear wheels. This provides unexpected advantages in certain applications. For example, when applied to zero turning radius work machines, positioning the axis of edging disc 1 to be in line with the axis of the rear wheels mitigates or substantially eliminates displacement of the disc in the X axis direction when the work machine follows a curved path. When following a curved path, cutting disc 1 is able to rotate with minimal lateral force that would otherwise deflect it from following the desired path intended by an operator. These features enhance the ability to control cutting in a straight line and along predetermined curves.

When edging disc assembly 72 is coupled with a work machine, downward force may be applied to the edging disc 1 to penetrate underlying turf or ground surface by translation in downward direction in the Z axis direction and/or by rotation in a downward direction about an axis parallel with the X axis direction. It shall be appreciated that attachment member 22, member 24, member 30 and disc mounting member 2 comprise one example of a structure which couples a cutting implement to a tool mount and positions a cutting implement at a desired position relative to the tool mount. A variety of alternate coupling and positioning structures are contemplated as well as a variety of other desired cutting implement positions relative to a tool mount. It shall be further appreciated that edging disc 1 comprises one example of a ground working tool and that a variety of other ground working tools are contemplated.

Support wheel assembly 73 includes attachment member 21 and fasteners 12 which are structured to couple attachment member 21 with an actuatable tool mount of a work machine. Support wheel 26 is positioned generally in line with attachment member 21 and a tool mount and is rotatable relative thereto. In the illustrated embodiment set pin 16 is provided to maintain the relative positioning of support wheel 26 relative to attachment member 21 and allow support wheel 26 to be removed from or repositioned relative to attachment member 21 without requiring attachment member 21 to be removed from the tool mount of the work machine with which it is coupled. A variety of alternate coupling and fastening structures are also contemplated.

During tool operation the positioning of support wheel 26 relative to the tool mount limits movement in the downward Z axis direction by virtue of contact between support wheel 26 and the underlying ground surface being worked while simultaneously accommodating rotation of the tool mount and assembly 72 about an axis parallel to the X axis direction. This allows an operator to adjust the force exerted by the edging disc 1 in the downward Z axis direction to vary the cutting depth or rotate the edging disc 1 out of contact with the underlying ground surface altogether. Translation in the Z axis direction may also vary these parameters.

Figure 3:
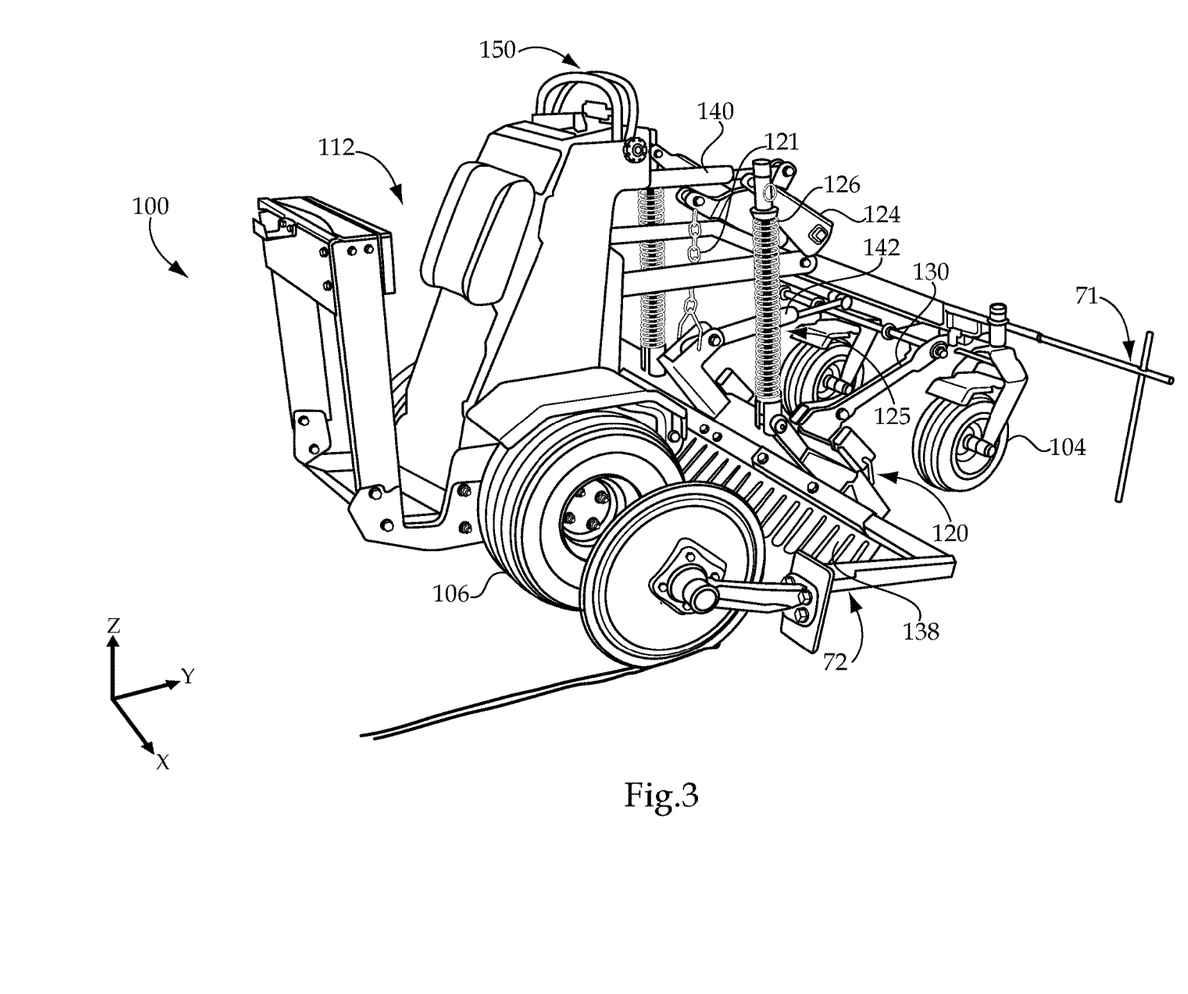
FIGS. 3-5 are perspective views of an exemplary edging tool operatively coupled with an exemplary work machine.
Figure 4:
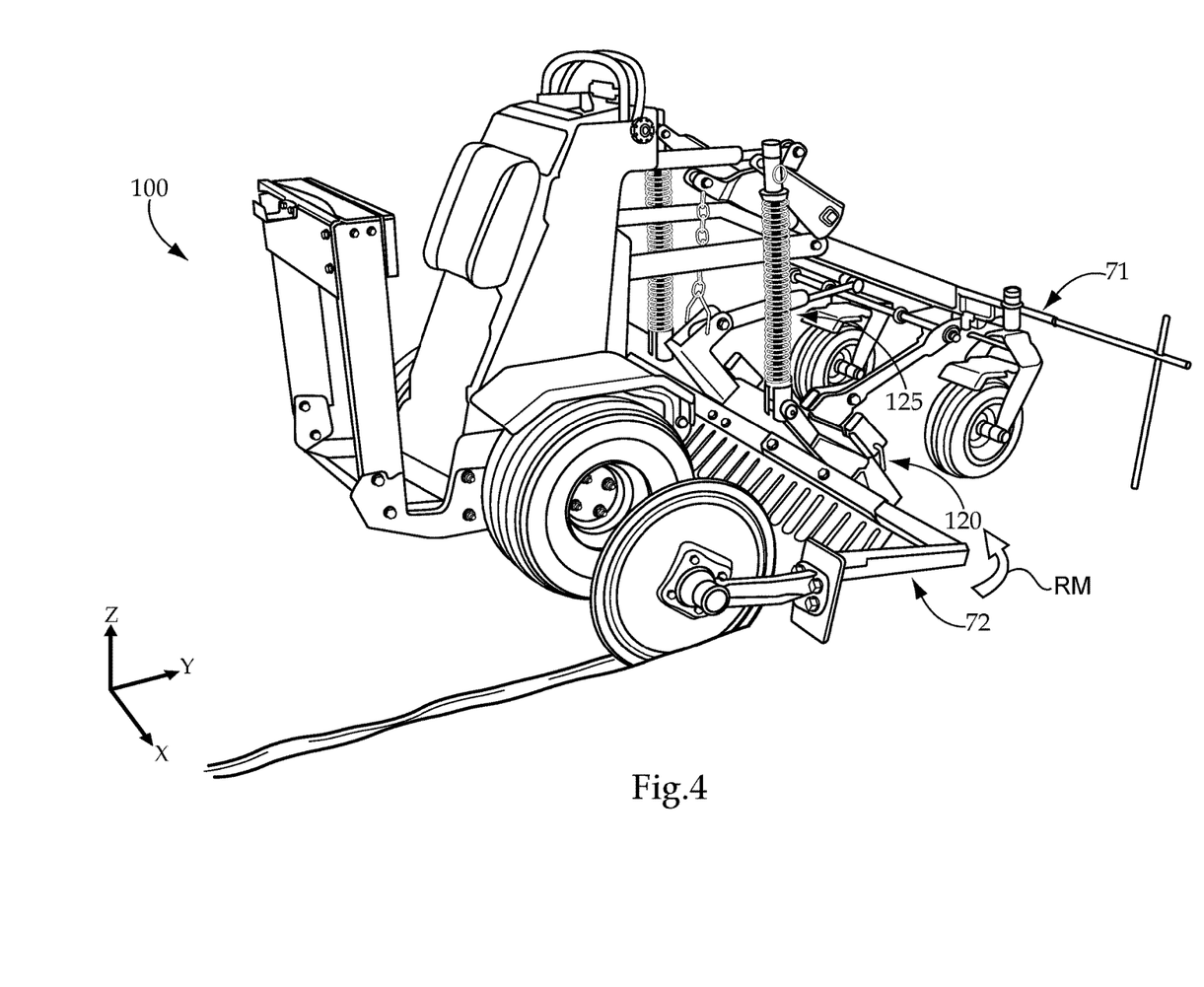
Figure 5:
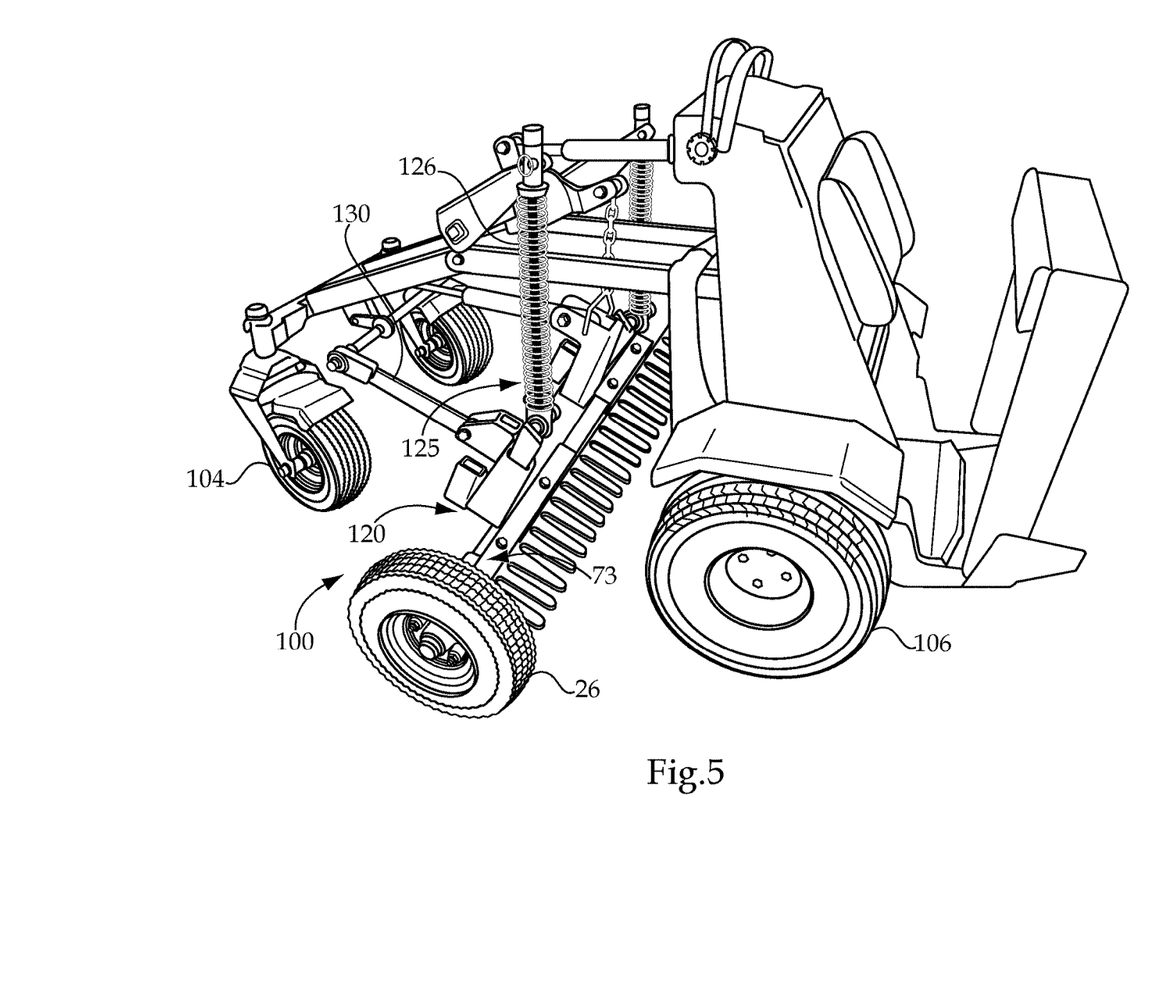

With reference to FIGS. 3-5 there are illustrated three perspective views of an exemplary self-propelled zero turning radius work machine 100 to which an edging tool 70 is attached. In the embodiment illustrated in FIGS. 3-5 the interconnection between the edging disc of edging tool 70 and member 30 is shown in a different form than in illustrated in FIGS. 1 and 2 but may alternatively include the form illustrated and described above. Work machine 100 includes a chassis supported by front wheels 104 and rear wheels 106 which contact a ground surface and support the chassis. In the illustrated embodiments the chassis is configured to provide an exemplary frame structure with which various work machine elements and tool elements are coupled. It shall be appreciated that frame structures comprise a variety of structures including frame based chassis, frame chassis, unibody chassis, or other types of chassis or support structures that are configured to be supported by ground contacting wheels or other ground contacting members and coupled with one or more soil working tools.

In the illustrated embodiments the front wheels 104 of work machine 100 are configured as caster type wheels which preferably are rotatable 360 degrees relative to the chassis. It shall be appreciated that a variety of differently configured front wheels 104 may be utilized including, for example, front wheels provided on an axle, rack and pinion assembly, or other types of front end steering assembly and/or front end drive assembly. It shall be further appreciated that additional embodiments may include only a single front wheel, a greater number of front wheels or may include ground surface contacting elements other than wheels, such as treads or tracks. While the front wheels 104 are non-driven wheels in the illustrated embodiment, it shall be appreciated that other embodiments comprise one or more driven front wheels configured to provide at least part of the propulsion to the vehicle.

In the illustrated embodiments the rear wheels 106 of work machine 100 are coupled with a machine prime mover (not visible in the illustrated views). In a preferred embodiment the prime mover comprises an internal combustion engine configured to drive a hydraulic pump that is flow coupled with a hydraulic drive system configured to provide torque to the rear wheels 106. Exemplary hydraulic drive systems may include elements such as high pressure accumulators, low pressure reservoirs, secondary pumps, gearboxes, collectors and/or differentials. In other embodiments the prime mover is configured as an internal combustion engine configured to provide driving torque through an output shaft. In other embodiments the prime mover comprises an electric motor configured to provide output torque. The electric motor may be powered by a battery or other power storage source, by a generator driven by an internal combustion engine or a combination thereof.

In the illustrated embodiments each of the rear wheels 106 is independently controllable and drivable in a forward or reverse direction, though other embodiments may comprise different drive wheel arrangements, including front wheel drive arrangements, all wheel drive and four wheel drive arrangements, to name several non-limiting examples. Certain embodiments may comprise only a single rear wheel or a greater number of rear wheels 106 or other ground contacting members.

The chassis supports an operator station 112 which includes a standing platform and a guard rail positioned at the aft end of work machine 100 adjacent the standing platform. Operator controls 150 are positioned to be manipulatable by an operator occupying the operator station 112 in order to control movement or propulsion of the work machine 100 as well as the positioning of one or more tools carried by the vehicle as further described herein. It shall be appreciated that operator control 150 may include one or more levers or other operator manipulable controls that are operatively coupled with valves and hydraulic fluid lines to control one or more hydraulic actuators of the work machine. For clarity of illustration these features have not been depicted in the illustrated embodiments.

Work machine 100 is configured as a substantially zero-turning radius machine, however it shall be appreciated that in additional embodiments the machine may be configured in a variety of other forms including, for example, a tractor, a skid steer an ATV, or another type of wheeled or treaded machine. Furthermore, in certain embodiments, the operator station 112 may comprise an operator seat instead of or in addition to a standing platform. In certain embodiments the operator station 112 may be omitted and the machine may be controlled remotely using a separate operator control station in wireless communication with a controller provided on the machine 100 and configured to control movement or propulsion of the machine 100 as well as the positioning of one or more tools carried by the vehicle.

The chassis is configured to support a tool mount 120. Tool mount 120 may be coupled with a variety of tools including assemblies 72 and/or 73 as well as a finishing comb 138, and scarifying shanks among other tools. Tool mount 120 is moveable relative to the chassis of work machine including translational movement generally in the direction of the Y axis, translational movement generally in the direction of the Z axis, and rotational movement about an axis generally parallel with the X axis direction. The tool mount is further coupled with an actuator 142 at a pivotable coupling. Actuator 142 is also coupled with the chassis of work machine 100 at a pivotable coupling. In the illustrated embodiments actuator 142 is configured as a hydraulic cylinder which is laterally expandable and contractible generally in the Y axis direction. The operator controls 150 may be configured to control the supply of pressurized hydraulic fluid to actuator 142 to control its position.

Tool mount 120 is connected to rocker 124 by a chain 121. Rocker 124 is coupled with actuator 140 at a pivotable coupling. Actuator 140 is also coupled with the chassis of the work machine 100 at a further pivotable coupling. In the illustrated embodiments actuator 140 is configured as a hydraulic cylinder which may be controlled in the same or similar fashion as actuator 142. It shall be appreciated that either or both of actuators 140 and 142 may be provided in different configurations, for example, as ratchets, top links or other actuators configured to provide appropriate displacement and force. It shall further be appreciated that either or both of actuators 140 and 142 may be omitted in certain embodiments. In such embodiments vertical adjustment of a tool mount is preferably, though not necessarily, provided by actuators configured to adjust other structural elements of a machine, for example, adjustable wheel suspension elements configured to raise or lower a chassis, frame or other structure supporting, directly or indirectly a tool mount, or via a variety of other actuators.

In the illustrated embodiments actuator 140 is selectably controllable to expand and contract in the Y axis direction effective to cause rocker 124 to rotate relative to the chassis about an axis parallel with the X axis direction. Rotation of the rocker 124 is effective to raise and lower the tool mount 120 with the chain 121 over a first predetermined range from a maximum height to the point at which the support wheel 26 contacts the ground surface 101 underlying the machine 100. Support wheel is structured to ride along the underlying ground and limit further downward motion of the tool mount 120 and structured coupled thereto while concurrently allowing further rotation of the rocker 124 to compress or decompress the springs 125 or other elements of suspension 126. Thus, rotation of the rocker 124 is effective to vary the amount of shock absorption force applied to the tool mount 120 by varying the compression of springs 126 without substantially changing the Z axis position of the tool mount 120. The suspension 125 accommodates movement of the tool mount in response to external force applied thereto, for example, if the tool mount contacts an obstruction such as a rock or other structure located in a soil medium being worked.

It shall be appreciated that chain 121 is one example of a weight lifting structure that may be utilized to raise and lower a soil working tool or tool mount. Structures such as cables, jointed linkages and other structures that limit relative displacement of a tool relative to a support structure to allow lifting through actuation in one direction, and deform, bend, flex, move or otherwise accommodate movement Actuator 142 is selectably controllable to expand and contract generally in the Y axis direction effective to cause tool mount 120 to rotate relative to the work machine about an axis generally parallel with the X axis direction as indicated by arrow RM. In this manner the pitch of the tool mount X-Y plane may be varied. This rotation can be utilized to raise and lower the edging disc of edging disc assembly 72 relative to the underlying ground surface and to control the depth of penetration of the edging disc into the underlying ground surface. For example, in FIG. 4, rotation in the direction indicated by arrow RM has caused the edging disc to penetrate deeper into the ground surface than in the position illustrated in FIG. 3. This depth and position adjustment may be performed either concurrently with or independently from the adjustments in tool mount 120 in the Z-axis direction described above.

Tool mount 120 is further coupled with a suspension 125 by a pivotable coupling. The suspension 125 is in turn connected to a rocker at a pivotable coupling. The rocker is further coupled with the chassis at a pivotable coupling. In the illustrated embodiments the suspension 125 is configured as a pair of telescoping cylinders in combination with springs 126 which are compressible between spring mounts through relative motion of the telescoping cylinders. It shall be appreciated that a variety of other suspensions may be utilized in various embodiments in addition to or instead of the illustrated configuration including shock absorbers, elastomeric suspension elements, compressible members, pneumatic suspension elements, hydraulic suspension elements, other spring arrangements and combinations of the foregoing and/or other suspension elements. It shall be further appreciated that a variety of springs and spring mounts may be utilized. In the illustrated embodiments springs 126 are helical and the spring mounts are crimped or compressed in place relative to respective shafts or cylinders of a telescoping assembly. In certain embodiments the spring mounts may alternatively or additionally be welded, bonded, bolted or otherwise fixedly coupled with respective suspension elements. Certain embodiments comprise spring mounts adjustably coupled with respective suspension elements, for example, through an axial threaded connection which may utilize one or more lock nuts or other locking members, or by a set screw, pin or bolt.

The tool mount 120 is further coupled with a pulling linkage 130 at a pivotable coupling which rotates generally about an axis in parallel with the X axis direction. Pulling linkage 130 is coupled with the chassis of the work machine at a pivotable coupling which rotates about an axis in parallel with the X axis direction. Pulling linkage is configured to provide a force vector component to the tool assembly in the forward or reverse Y axis direction as the machine is propelled forward or backward. A force vector component generally in the Y axis direction may also be provided, for example, during turning of the machine. Regardless of the particular direction, the pulling linkage provides one or more force vector components providing working force to the tool assembly 120. Furthermore, the rotation permitted by pivotable couplings 151 and 153 accommodates both adjustment of the height and pitch of the tool assembly 120 relative X-Y plane.

The actuators of the illustrated embodiment are selectably controllable to move the tool mount 120 as described above as well as to vary force applied to the tool mount 120 by varying the compression of springs 126 of suspension 125. The suspension 125 accommodates movement of the tool assembly in response to external force applied thereto, for example, if the tool assembly, the cutting disc 1, or another portion of assemblies 72 or 73 contacts an obstruction such as raised soil, compact dense soil, a rock or other structure located in a soil medium being worked. It shall be appreciated that the too mount and tools may be configured such that the actuators are selectably controllable to rotate the tool mount so that edging disc 1 and another tool (e.g., finishing comb 138, scarifying shanks or other tools) engage the underlying ground surface either at the same degree of rotation at separate degrees of rotation.

Figure 6:
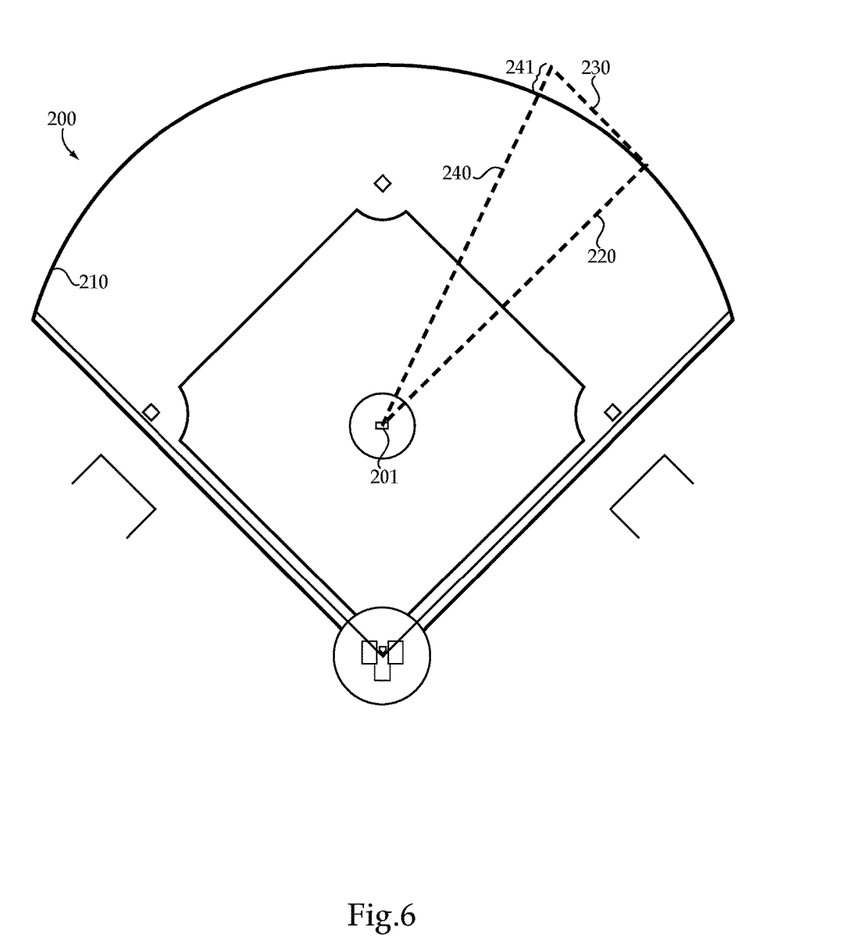
FIG. 6 is top diagrammatic view of a baseball diamond with annotations illustrating a technique for determining position of a sighting guide of an exemplary edging tool operatively coupled with a work machine.

With reference to FIG. 6 there is illustrated a top view of a baseball diamond 200 with annotations illustrating a technique for determining position of a sighting guide of an edging tool such as the example described above in connection with FIGS. 1-5. In the illustrated embodiment, the desired sighting guide position is one which will allow the cutting implement of the work machine to follow the path of the edge of the outfield of baseball diamond 200 which defined by arcuate line segment 230. Line segment 220 defines a radius extends from a point 201 at or about the center of the pitcher's mound to the edge of the outfield denoted by line segment 230. Line segment 230 is at a right angle relative to line segment 220. A common prescribed distance for line segment 220 is 95 feet which is typical of certain professional baseball diamonds. Another common prescribed distance for line segment 220 is 50 feet which is typical of certain amateur baseball diamonds. Various other baseball diamonds may have different geometries. Furthermore, a variety of alternate arcuate or curved edging line geometries are contemplated.

Line segment 230 denotes the distance from the position of the cutting implement of the edging tool coupled with the work machine to a position even with a sighting marker coupled with the work machine, e.g., the position of the sighting marker assembly illustrated and described in connection with FIGS. 1-5. The distance of line segment 230 is exaggerated in FIG. 6 to allow for clear illustration. In a preferred embodiment, the actual distance of line segment 230 is 5 feet. Line segment 240 denotes the distance from an end of line segment 230 to point 201. Portion 241 of line segment denotes the difference between the length of the radius from point 201 to line segment 230 and the total length of line segment 240. Portion 241 also indicates the appropriate position for the sighting guide to follow the curve of line segment 230.

The relationships illustrated in FIG. 6 can be utilized to determine a desired sighting guide position using a Pythagorean relationship for the illustrated line segments 220, 230 and 240. The general form of the determination is as follows:

$$\text{Distance\_240} = (\text{Distance\_220}^2 + \text{Distance\_230}^2)^{-0.5} \quad \text{(Eq. 1)}$$

$$\text{Distance\_241} = \text{Distance\_240} - \text{Distance\_220} \quad \text{(Eq. 2)}$$

$$\text{Distance\_241} = (\text{Distance\_220}^2 + \text{Distance\_230}^2)^{0.5} - \text{Distance\_220} \quad \text{(Eq. 3)}$$

Solving these equations for a 95 foot radius distance of line segment 220 gives Distance 241=1 5/16 inches. Solving for a 50 foot radius distance of line segment 220 gives Distance 241=3 inches. These distances can be utilized to position a sighting guide so that the operator can cut a desired outfield edge for different types of baseball diamonds. Furthermore, it shall be appreciated that these principles can be utilized for a variety of other geometries.

While exemplary embodiments have been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Language indicating spatial or geometric relationships, directions or characteristic shall be understood to include and encompass relationships that are within a margin of variation which a person of skill in the art would deem acceptable for a given application.

What is claimed is:

1. A work machine comprising:
   a frame extending along a length in a Y axis direction, a width in an X axis direction perpendicular to the Y axis direction, and a height in a Z axis direction perpendicular to the X axis direction and the Y axis direction;
   a front ground contacting member rotatably coupled with the frame at a first position;
   a rear ground contacting member rotatably coupled with the frame at a second position rearward of the first position in the Y axis direction;
   a tool mount extending along the width of the frame;
   a linkage coupled with the frame and coupled with the tool mount, the linkage including a suspension element structured to accommodate movement of the tool mount in response to externally applied force;
   a tool assembly coupled with the tool mount, the tool assembly including an arm extending in the Y axis direction toward the second position, a ground working tool coupled with the arm such that the ground working tool is positioned rearward of the tool mount, and a tool mount ground contacting member rotatably coupled with the tool mount; and
   an actuator system structured to selectably adjust the position of the tool mount in the Z axis direction such that the tool mount and the tool assembly are adjustable from a first position in which the tool mount ground contacting member is spaced apart from an underlying ground surface, a second position in which the tool mount ground contacting member contacts the underlying ground surface and the suspension element is in a first state of compression, and a third position in which the tool mount ground contacting member contacts the underlying ground surface and the suspension element is in a second state of compression including greater compression than the first state, and in both the second position and the third position to selectably rotate the tool mount about a rotational axis to vary a depth of penetration of the ground working tool into the underlying ground surface.

2. The work machine of claim 1 comprising:
   a sighting guide coupled with and extending from the frame in the X axis direction at a location forward of the tool mount in the Y axis direction, the sighting guide including a marker being adjustable in the X axis direction to a first position selected such that the ground working tool follows a first path indicated by the marker when the work machine travels along a straight path and to a second position selected such that the ground working tool follows a second path indicated by the marker when the work machine travels along a curved path.

3. The work machine of claim 1 wherein the ground working tool comprises a disc rotatably coupled with the arm.

4. The work machine of claim 1 wherein the ground working tool is rotatable about a ground working tool axis that is adjustable by the actuator system to a position in line with a rotational axis of the rear ground contacting member.

5. The work machine of claim 1 wherein the ground working tool is adjustable relative to the arm such that the width of a furrow cut by the ground working tool is variable from a minimum width to a maximum width greater than the minimum width.

6. The work machine of claim 1 wherein the work machine is structured as a zero turn radius work machine.

* * * * *